US008926185B2

(12) United States Patent
Gaumer et al.

(10) Patent No.: US 8,926,185 B2
(45) Date of Patent: Jan. 6, 2015

(54) SPHERICAL PLAIN BEARING WITH LUBRICATION GROOVE

(71) Applicant: Roller Bearing Company of America, Inc., Oxford, CT (US)

(72) Inventors: Brian Gaumer, Watertown, CT (US); Robert Lugosi, Oxford, CT (US); James Voisine, Bristol, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 17 days.

(21) Appl. No.: 13/682,886

(22) Filed: Nov. 21, 2012

(65) Prior Publication Data

US 2013/0142463 A1 Jun. 6, 2013

Related U.S. Application Data

(63) Continuation-in-part of application No. 12/144,140, filed on Jun. 23, 2008, now abandoned, which is a continuation-in-part of application No. 11/880,138, filed on Jul. 19, 2007, now abandoned.

(60) Provisional application No. 60/832,054, filed on Jul. 19, 2006.

(51) Int. Cl.
F16C 23/04 (2006.01)
F16C 33/74 (2006.01)
F16C 33/10 (2006.01)
F16C 33/02 (2006.01)

(52) U.S. Cl.
CPC ............... F16C 33/02 (2013.01); F16C 33/74 (2013.01); F16C 33/1065 (2013.01); F16C 23/045 (2013.01); F16C 33/103 (2013.01); F16C 33/102 (2013.01); F16C 2240/42 (2013.01); F16C 2240/70 (2013.01)
USPC .............................. 384/206; 384/145; 384/286

(58) Field of Classification Search
CPC .. F16C 11/06; F16C 11/0604; F16C 11/0614; F16C 11/0623; F16C 11/068; F16C 23/043; F16C 23/045; F16C 33/103; F16C 33/1065; F16C 2240/42; F16C 2240/70
USPC ......... 384/145–147, 151–156, 192, 206–209, 384/213, 286, 291, 293
See application file for complete search history.

(56) References Cited

U.S. PATENT DOCUMENTS 3,243,212 A 3/1966 May
3,395,951 A 8/1968 Barr et al.
(Continued)

FOREIGN PATENT DOCUMENTS

EP 1489315 12/2004
JP 2114223 9/1990
(Continued)

OTHER PUBLICATIONS

PCT International Search Report, Application No. PCT/US2007/016502, dated Dec. 6, 2007.
(Continued)

Primary Examiner — James Pilkington
(74) Attorney, Agent, or Firm — MKG, LLC

(57) ABSTRACT

A spherical bearing has an outer ring with a concave bearing surface and an inner ring having a convex bearing surface, which is in sliding engagement with the concave bearing surface. A lubrication groove is formed in the convex bearing surface and/or the concave bearing surface. The lubrication groove is defined by a concave central portion and by convex side portions. The concave central portion has a first radius of curvature and the convex side portions have a second radius of curvature. The second radius of curvature is at least 0.7 times the first radius of curvature.

24 Claims, 10 Drawing Sheets

(56) References Cited

U.S. PATENT DOCUMENTS

| | | |
|---|---|---|
| 3,666,331 A | 5/1972 | Curtis |
| 3,765,733 A | 10/1973 | Hackman et al. |
| 4,105,267 A | 8/1978 | Mori |
| 4,109,976 A | 8/1978 | Koch |
| 4,765,757 A | 8/1988 | Hartl |
| 5,052,881 A | 10/1991 | Keffeler et al. |
| 5,265,964 A | 11/1993 | Hooper |
| 5,547,288 A | 8/1996 | Quinn et al. |
| 5,660,482 A | 8/1997 | Newley et al. |
| 5,964,325 A | 10/1999 | Davison et al. |
| 6,290,398 B1 | 9/2001 | Fujiwara et al. |
| 6,626,575 B2 | 9/2003 | Hartl |
| 6,729,763 B2 | 5/2004 | Post et al. |
| 2002/0090154 A1* | 7/2002 | Murray .................. 384/192 |
| 2002/0186904 A1 | 12/2002 | Hartl |
| 2005/0036722 A1 | 2/2005 | Sato et al. |
| 2005/0078893 A1 | 4/2005 | Furuta et al. |
| 2008/0040886 A1 | 2/2008 | Arnold et al. |

FOREIGN PATENT DOCUMENTS

| | | |
|---|---|---|
| WO | 9631708 | 10/1996 |
| WO | 2006009175 | 1/2006 |
| WO | 2008011171 A1 | 1/2008 |

OTHER PUBLICATIONS

International Search Report and Written Opinion of the International Searching Authority for corresponding PCT Application No. PCT/US2013/068626, dated Jan. 20, 2014.

* cited by examiner

SPHERICAL PLAIN BEARING WITH LUBRICATION GROOVE

CROSS REFERENCE TO RELATED APPLICATIONS

This application is a continuation-in-part application of U.S. Ser. No. 12/144,140, filed Jun. 23, 2008, which is a continuation-in-part of U.S. Ser. No. 11/880,138, filed Jul. 19, 2007, which claims the benefit of U.S. provisional application No. 60/832,054 filed Jul. 19, 2006, which are incorporated herein by reference in their entirety.

TECHNICAL FIELD

This invention relates to spherical plain bearings and, more particularly, to a spherical plain bearing having one or more lubrication grooves.

BACKGROUND OF THE INVENTION

Spherical plain bearings generally include inner and outer ring members wherein the outer ring member has a spherical concave interior surface that defines a cavity therein and wherein the inner ring member is disposed in the cavity and has a spherical convex surface that is complementary to, and is dimensioned to match, the interior concave surface of the outer ring member. In the assembled bearings, the concave and convex surfaces slide over each other to define the bearing surfaces or "load zone."

A lubricant may be provided in the load zone of the bearing to minimize wear and to enhance rotational characteristics. In some spherical plain bearings, a lubrication groove may be provided in one of the sliding surfaces. The lubrication groove is a recess from the sliding surface within which a reserve of lubricant can be disposed. The recess is open to the other sliding surface, which can be contacted by the lubricant. As the second surface slides over the first, lubricant is carried between the sliding surfaces to lubricate the bearing. A conventional lubrication groove has sharp edges at the sliding surface of the ring member on which is it formed. The sharp edges tend to wipe lubricant from the surface as one ring member moves relative to the other ring member, thus inhibiting lubricant from lubricating the bearing.

Also in some spherical plain bearings, seals may be incorporated in an attempt to retain the lubricant in the load zone and to prevent or at least limit the flow of lubricant from the load zone. These configurations have a natural tendency to be easily removed after wear has occurred (either inadvertently or intentionally) or to be difficult to position in place initially. Furthermore, these sealing members are often undesirably located on the edges of the ring members of the bearings and adjacent to the contact surfaces of the load zone. When located on the edges of the ring members and adjacent to the contact surfaces of the load zone, the sealing members are easily damaged and/or dislodged, which makes it harder to maintain the seal to retain the lubricant in the load zone. Furthermore, the wiping function of the seal (ability to spread the lubricant on the bearing surface proximate the area at which the seal contacts the bearing surface) may be compromised.

SUMMARY OF THE INVENTION

In one aspect, the present invention resides in a spherical bearing having an outer ring with a concave bearing surface and an inner ring having a convex bearing surface, which is in sliding engagement with the concave bearing surface. A lubrication groove is formed in the convex bearing surface and/or the concave bearing surface. The lubrication groove is defined by a concave central portion and by convex side portions. The concave central portion has a first radius of curvature and the convex side portions have a second radius of curvature. The second radius of curvature is at least 0.7 times the first radius of curvature, for example greater than or equal to 0.7 times the first radius of curvature.

In another aspect, the present invention resides in a spherical plain bearing with dual sealing capability. As used herein, the term "dual sealing capability" means that one sealing member provides two sealing surfaces. The bearing in this aspect of the present invention includes an outer race bearing member having an outer ring and an inner race bearing member having an inner ring, the inner ring being located within an opening defined by the outer ring. The opening is defined in part by two generally opposed peripheral edges with a spherical concave bearing surface extending therebetween. The inner ring defines a bore extending therethrough and a spherical convex bearing surface engagable with the concave bearing surface defined by the outer ring. When assembled, the outer spherical convex bearing surface is located in interfacial sliding engagement with the inner spherical concave bearing surface. The inner ring and the outer ring are through hardened. A first ring seal is positioned in a first seal groove defined by the outer ring. The first seal groove, and thereby the first ring seal, is positioned inboard of a first face surface defined by the outer ring. A second ring seal is positioned in a second seal groove, generally opposite the first seal groove and positioned inboard of the second seal face. The first and second ring seals each have first and second lips that are connected together to form a substantially v-shaped cross-sectional geometry. Each of the first and second lips provides a seal, thereby allowing the bearing to exhibit the dual sealing capability. The outer and inner rings are case hardened.

In another aspect of the present invention, the above-described bore includes a pair of ring seals positioned therein and located generally opposite one another. The pair of ring seals is configured in the same manner as the above-described first and second ring seals with each having a first and second lip. During operation, the pairs of ring seals engage a shaft portion positioned in the bore.

One advantage of the present invention is that an effective sealing and wiping of a bearing surface is realized even after extended bearing use. This is achievable due to the flexibility and cross-sectional geometry of the first and second ring seals. Because of the flexible resilience of the material from which the sealing member is formed in conjunction with a v-shaped cross-sectional geometry defined by the first and second lips, wear occurs substantially evenly on the first and second lips of the sealing member without detrimentally effecting sealing and wiping abilities. In particular, the spreading and compression of the sealing member enhances the sealing communication with the bearing surface and at the same time allows wear to occur while still maintaining the seal. The lips of the sealing member are flexed outward less as they wear. Thus, tolerances in the bearing are taken up by the seal, thereby providing a self-adjusting characteristic not present in constructions heretofore.

Another advantage of the present invention is that there are two lips in each sealing member to provide the dual sealing function to the bearing. This dual sealing provides enhanced lubrication, minimizes contamination of the bearing, and at the same time provides a self-adjusting characteristic not present in bearings having sealing members having only a single lip. In addition, the sealing members of the present invention permit the collection of lubricant therein, and the lubricant itself serves as a barrier to the introduction of contaminants (such as environmental dirt or other particulates) into the load zone of the bearing.

Another advantage is that the dual sealing configuration of the present invention allows for the possibility of flushing degraded or contaminated lubricant out of the load zone by forcing fresh lubricant into the sealing member via a lubricant aperture. Adequate flushing pressure will allow the fresh lubricant to drive unwanted lubricant past the outer lip of the sealing member, and the seal will retain the fresh lubricant in the load zone once the flushing pressure is removed.

Still another advantage of the present invention derives from the heat treatment of the inner and outer rings. The increased hardness of the rings, particularly at the above-described concave and convex surfaces, increases the durability of the bearing.

DETAILED DESCRIPTION OF THE INVENTION

Figure 1:
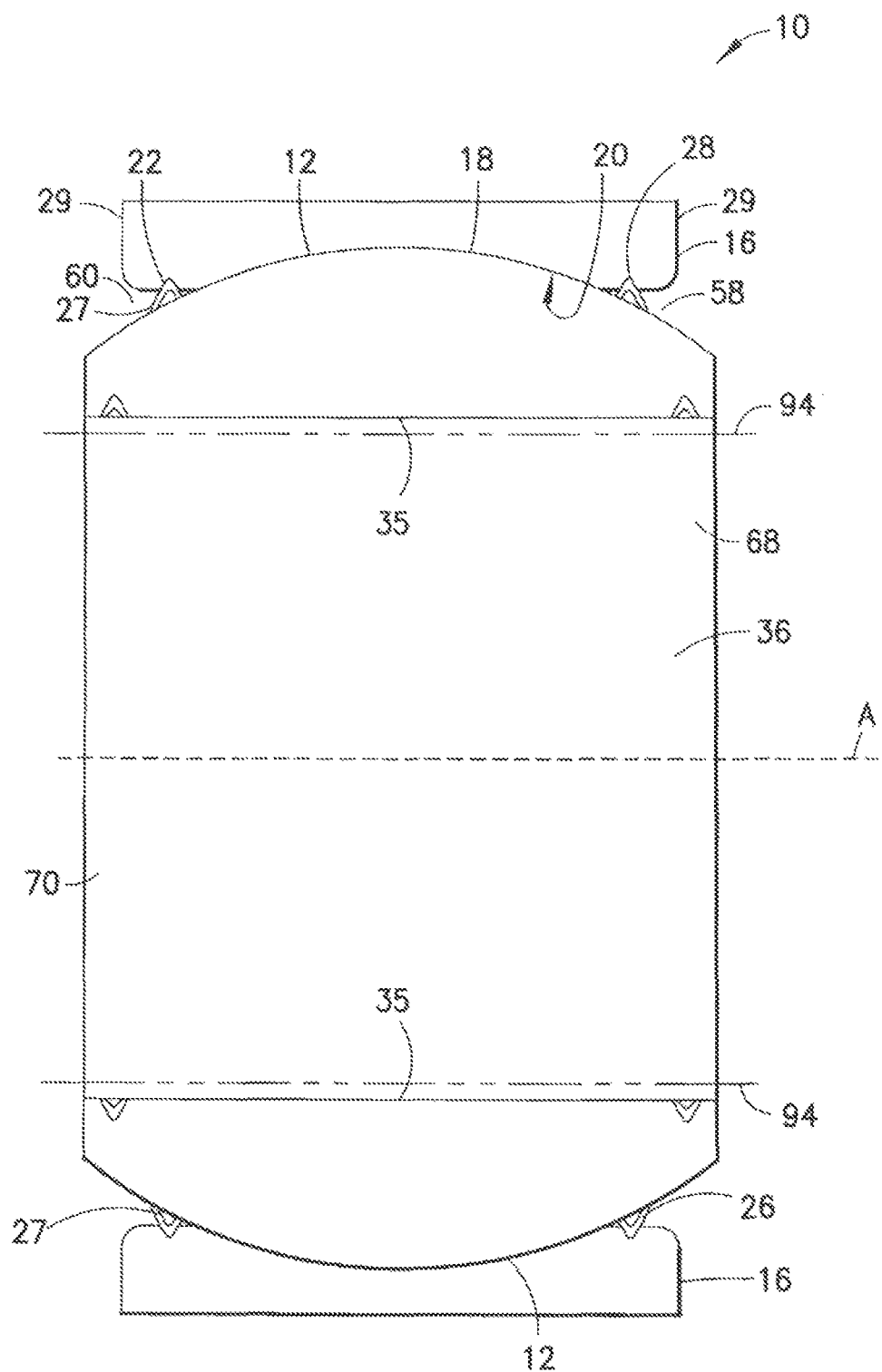
FIG. 1 is a cross-sectional side view of a spherical plain bearing, of the present invention.

As shown in FIG. 1, a spherical plain bearing is designated generally by the reference number 10 and is hereinafter referred to as "bearing 10." Bearing 10 includes an inner ring 12 and an outer ring 16. The inner ring 12 has an annular configuration that defines a central axis and has a spherical convex bearing surface 18. The inner ring 12 also has an interior peripheral surface 35 that defines a bore 36 that extends through the inner ring. The bore 36 includes a first opening 68 at one end thereof and a second opening 70 at an opposite end thereof. The outer ring 16 has an annular configuration that also defines a central axis. The outer ring 16 has a spherical concave bearing surface 20 and is open at a first axial end 58 and a second axial end 60. The spherical convex bearing surface 18 and the spherical concave bearing surface 20 are load bearing surfaces. In one embodiment, the outer ring 16 and the inner ring 12 are through hardened. In another embodiment, the outer ring 16 and the inner ring 12 are case hardened. When the bearing 10 is assembled, the spherical convex bearing surface 18 and the spherical concave bearing surface 20 reside in interfacial engagement with one another, and the central axes of both the inner ring 12 and the outer ring 16 are coaxial with one another to define a central axis A.

A lubricant can be provided at a load zone of the bearing 10, namely, at the interfacially engaged surfaces of the spherical convex bearing surface 18 and the spherical concave bearing surface 20. This lubricant is selected and applied in sufficient amount to minimize wear, enhance rotational characteristics, and decrease rotational friction with regard to the bearing 10.

The outer ring 16 includes first and second outer ring seals, 26 and 27, respectively, that extend circumferentially around the outer ring. In one embodiment, the first outer ring seal 26 is located proximate the first axial end 58, and the second outer ring seal 27 is located proximate the second axial end 60. Each outer ring seal, 26 and 27, is seated in a seal mounting groove 22 that extends peripherally around the outer ring 16. These outer seal mounting grooves 22 are located inward of the openings at the axial ends of the outer ring 16, namely, spaced some distance from the outer peripheral edges of the bore 36. In the assembled bearing 10, the first and second outer ring seals 26 and 27, respectively, are in spherical engagement with the spherical convex bearing surface 18 of the inner ring 12 and the spherical concave bearing surface 20 of the outer ring. When first and second outer ring seals, 26 and 27, are used, they retain lubricant between the outer rings seals and at the interface of the spherical convex bearing surface 18 and the spherical concave bearing surface 20.

Figure 2:
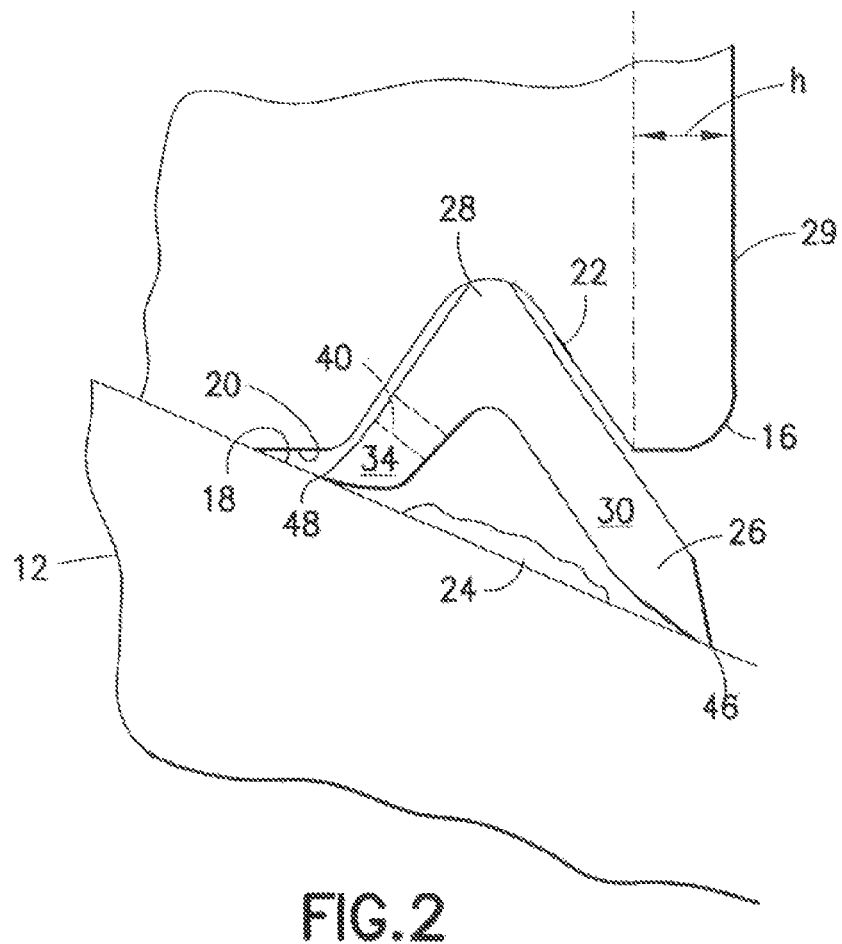
FIG. 2 is a cross-sectional side view of a sealing member located between the inner and outer races of the bearing of FIG. 1.

As is shown in FIG. 2, the seal mounting grooves 22 are located inward of an outer face 29 of the outer ring 16 by a distance h. Although the distance h is disclosed as being the same distance for the seal mounting grooves 22 at each end of the outer ring 16, the present invention is not limited in this regard, and the seal mounting grooves may be located at different distances from each end of the outer ring. The first and second ring seals, 26 and 27, respectively, each include a seal base member 28 that is configured to be matingly received in the respective seal mounting groove 22 of the outer ring 16. Each of the first and second ring seals, 26 and 27, respectively, also includes sealing members in the form of an outer lip 30 and an inner lip 34, each of which extend from the seal base member 28 to define a ring having a substantially v-shaped cross-sectional geometry. As shown, the inner lip 34 is shorter than the outer lip 30. In the assembled bearing, the inner lip 34 and the outer lip 30 are each spread away from the other and urged against the spherical convex bearing surface 18 of the inner ring 12. Also, both the inner lip 34 and the outer lip 30 provide the same or similar amounts of pressure on the spherical convex bearing surface 18.

In one embodiment, the first and second ring seals 26 and 27, respectively, may additionally include one or more lubrication holes 40 that extend through the inner lip 34. These lubrication holes 40 allow the lubricant to flow from the area of interfacial engagement of the spherical convex bearing surface 18 and the spherical concave bearing surface 20 to the area located between the inner lip 34 and the outer lip 30. The flow of lubricant (shown at 24) to this area further enhances the operation of the bearing 10.

Sealing communication between the inner lip 34 and the outer lip 30 with the spherical convex bearing surface 18 is generally effected by edges of the inner and outer lips 34 and 30, respectively. The innermost edge (relative to the assembled bearing 10) of the inner lip 34 includes an inner edge 48. The outermost edge of the outer lip 30 also includes an outer edge 46. Both the inner edge 48 and the outer edge 46 facilitate wiping contact with the spherical convex bearing surface 18, thereby maintaining suitable amounts of the lubricant 24 both at the load zone as well as in the area between the inner lip 34 and the outer lip 30.

Figure 3:
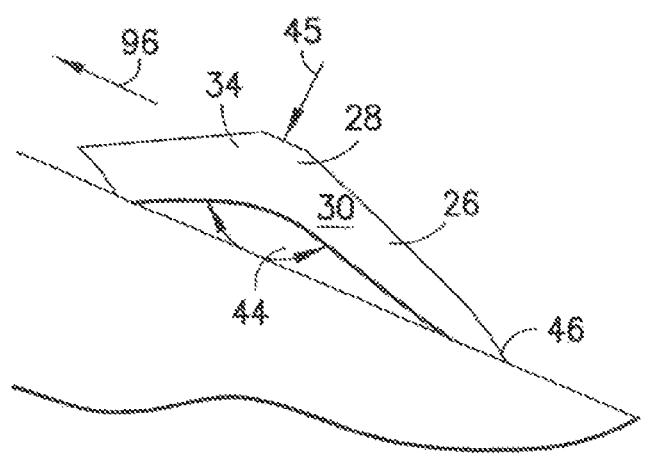
FIG. 3 is a cross-sectional side view of the insertion of the sealing member of the bearing of FIG. 1 into a seal mounting groove of the outer race.

As is shown in FIG. 3, the flexible resilience of the outer ring seal 26 allows it to be inserted into the seal mounting groove 22. When compressed in the direction of an arrow 45 at the seal base member 28, the outer ring seal 26 is deformed such that the inner lip 34 and the outer lip 30 are urged in opposite directions and outward. When the inner lip 34 and the outer lip 30 are urged outward, an angle 44 is formed therebetween. The outer ring seal 26 can then be moved in the direction of an arrow 96 along the spherical convex bearing surface 18 of the inner ring 12 and under the edge of the outer ring 16. Once appropriately located, the compression (arrow 45) can be released, and the outer ring seal 26 will "snap" into place in the seal mounting groove 22. Compressing the outer ring seal 26 as well as moving the outer ring seal in the direction of the arrow 96 can be affected manually or via the use of automatic mechanisms.

Figure 4:
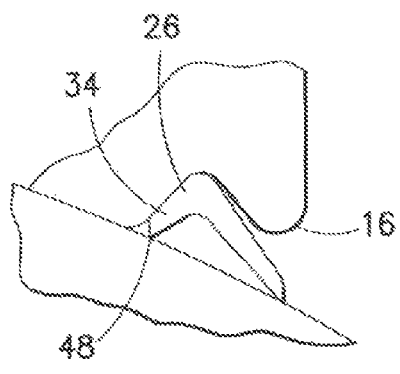
FIG. 4 is an alternate embodiment of a sealing member of the present invention.
Figure 5:
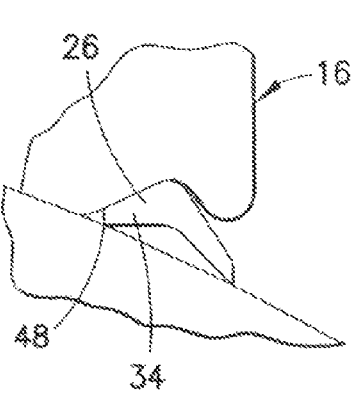
FIG. 5 is another alternate embodiment of a sealing member of the present invention.
Figure 6:
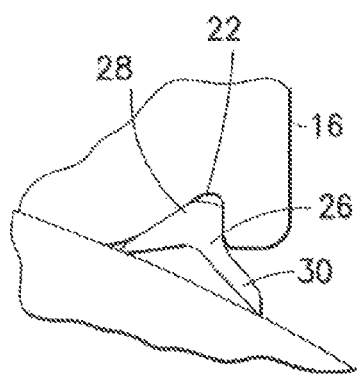
FIG. 6 is another alternate embodiment of a sealing member of the present invention.
Figure 7:
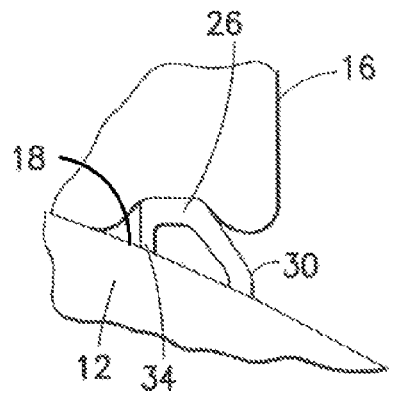
FIG. 7 is another alternate embodiment of a sealing member of the present invention.
Figure 8:
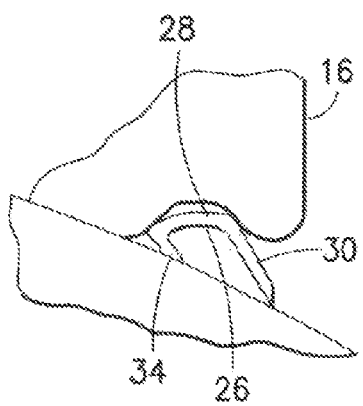
FIG. 8 is another alternate embodiment of a sealing member of the present invention.
Figure 9:
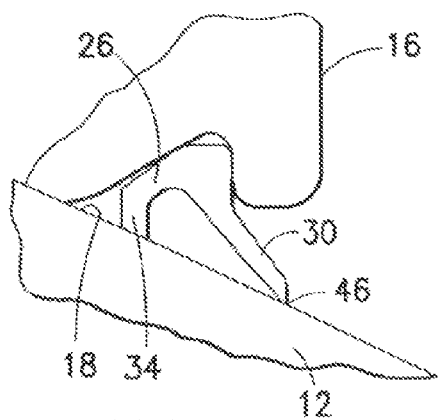
FIG. 9 is another alternate embodiment of a sealing member of the present invention.

The outer ring seal 26, as is shown in FIGS. 1 and 2, includes a longer outer lip 30 and a shorter inner lip 34. The configurations of these two lips enable the outer ring seal 26 to flexibly accommodate the spherical convex bearing surface 18 of the inner ring 12 and to provide a suitable wiping function for the lubricant. As is shown in FIGS. 4-9, however, the outer ring seal 26 may be configured otherwise. In FIG. 4, the inner lip 34 includes a squared edge 48. In FIG. 5, the inner lip 34 includes a rounded edge 48. In FIG. 6, the seal base member 28 is offset in the direction of the outer lip 30 to provide a surface that can be more positively retained in the seal mounting groove 22 in the outer ring 16. In FIG. 7, the outer ring seal 26 has an angular cross-sectional geometry and instead of sharp edges on the inner lip 34 and the outer lip 30, the inner lip and the outer lip each have flat surfaces that engage the spherical convex bearing surface 18 of the inner ring 12. In FIG. 8, the inner lip 34 is angled outward and in the same direction as the outer lip 30. The seal base member 28 is configured accordingly and may be elongated (widened) to provide a suitable surface area from which both the inner lip 34 and the outer lip 30 can depend. In FIG. 9, the outer ring seal 26 again has an angular cross-sectional geometry, but the outer lip 30 has a sharp edge 46 that contacts the spherical convex bearing surface 18 of the inner ring 12 whereas the inner lip 34 has a flat surface that engages the spherical convex bearing surface. In any of the foregoing embodiments, however, the outer ring seal 26 is located inward of the outer edge of the outer ring 16.

Referring back to FIG. 1, a sealing arrangement similar to the above-described arrangement can be used to provide a seal between the inner ring 12 and a member 94 located in the inner ring. The member 94 may be a shaft or the like, and it may be stationary or rotatable within the inner ring 12. Referring now to both FIGS. 1 and 10, the inner ring 12 includes inner ring seals 126 that extend around the edges thereof proximate the first opening 68 and the second opening 70 defined by the bore 36. Preferably, one inner ring seal 126 is located at the first opening 68, and another inner ring seal is located at the second opening 70.

Each inner ring seal 126 is seated in a seal mounting groove 122. These seal mounting grooves 122 are located inward of the first opening 68 and the second opening 70 of the bore 36 by a distance k. Although the distance k is disclosed as being the same distance for the seal mounting groove 122 at each of the first opening 68 and the second opening 70, the present invention is not limited in this regard, and the seal mounting grooves located at each end of the bore 36 may be located at different distances from the edges of the bore.

During operation, the inner ring seals 126 maintain the member 94 and the interior peripheral surface 35 in sealing engagement, thereby retaining any lubricant at the interface of the interior mounting surface and the movable member between the inner ring seals 126 at the opposing ends of the bore 36 and further preventing or at least limiting the introduction of moisture, debris, or contaminating elements into the bearing 10.

Figure 10:
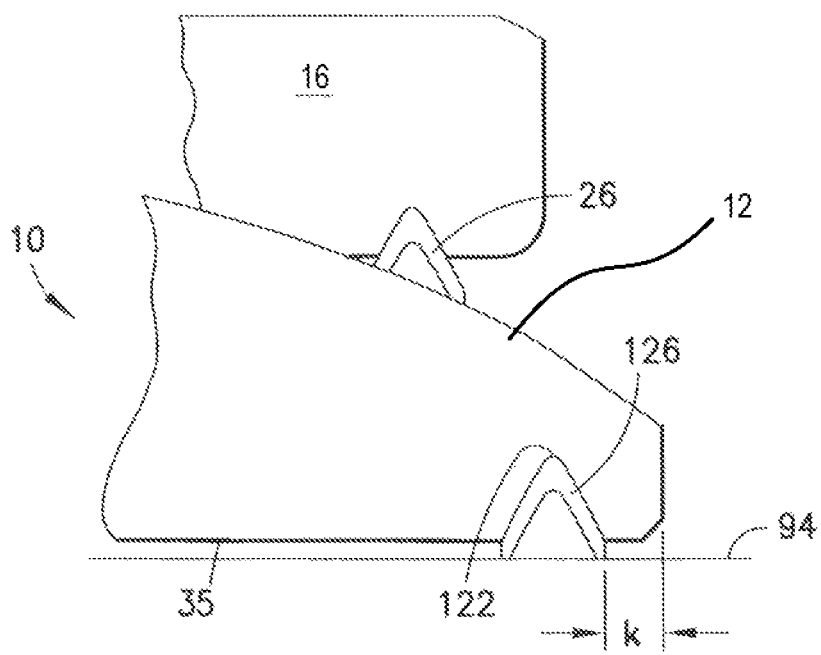
FIG. 10 is a cross-sectional side view of a bearing assembly, of the present invention, having a first sealing member located between the inner and outer races and a second sealing member located between the inner race and a member operably located in the inner race.
Figure 11:
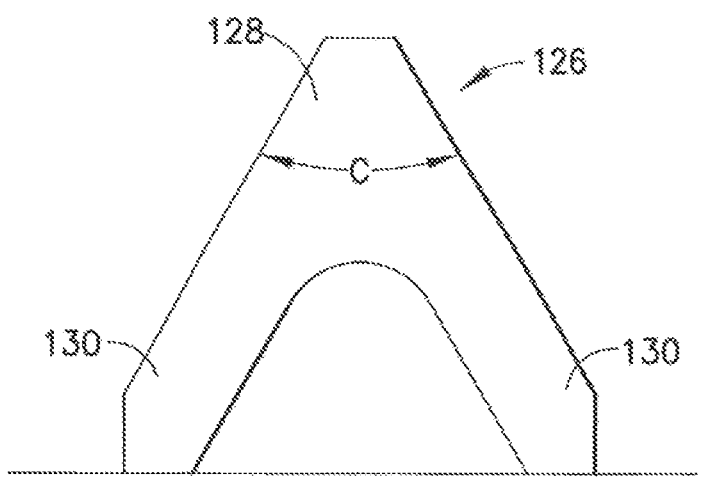
FIG. 11 is a cross-sectional side view of the second sealing member of FIG. 10.

As is shown in FIG. 11, the inner ring seal 126 includes a seal base member 128 that is configured to be matingly received in the inner ring seal mounting groove 122 (FIG. 10). Two lips 130 extend from the seal base member 128 to define the ring structure of the inner ring seal 126 as having a substantially v-shaped cross-sectional geometry. As shown, both lips 130 are substantially the same size and extend from the seal base member 128 at substantially the same angle c to provide similar amounts of pressure on the surface of the member 94 located within the bearing. The ends of the lips 130 are flat. The present invention is not limited to flat-ended lips, however, as other configurations (e.g., rounded, ridges extending in the direction of rotation or movement of the member positioned in the inner ring, and the like) are within the scope of the present invention.

In any of the above-described embodiments, the mating surfaces of the spherical plain bearing 10 may be treated to increase the useful life of the bearing in combination with the lubricant and/or any other lubrication means. For example, either one or both of the mutually sliding surfaces of a metallic spherical plain bearing may be treated to increase their hardness, i.e., the outer ring 16 and the inner ring 12 may be case hardened (also referred to herein as "heat treated"). Suitable case-hardening surface treatments include carburizing, which is the diffusion of carbon into the surface of a metal. The present invention is not limited to carburizing, however, as other processes such as nitriding, carbonitriding, and nitrocarburizing are equally applicable and within the scope of the present invention. When carburizing or any other metal treating process is used in combination with a lubricant as described herein, the case hardened surfaces may be employed in environments in which surface-treated bearings would not otherwise be used.

Another feature that is useful for retaining lubricant on a bearing surface is a lubrication groove, which may be formed on a bearing surface in the load zone (i.e., on the spherical convex or spherical concave bearing surfaces) or on the interior surface of the inner ring (to face the shaft or other member on which the bearing is mounted). The lubrication groove may have contoured sides that have a reduced tendency to wipe lubricant from a facing bearing surface, relative to a lubrication groove having a sharp edge, as in the prior art. Each side of a contoured groove may be rounded to smoothly blend the interior surface of the groove with the bearing surface, i.e., to meet the first bearing surface in a substantially tangential manner. In this way, the tendency of a sharp edge to wipe lubricant from an opposing second bearing surface that faces the first surface is ameliorated. The side edges may be rounded to conform, in cross-section, to a convex curvature that meets the first bearing surface in a substantially tangential manner, such that the groove surface is substantially blended into the bearing surface.

A segmented lubrication groove is one that comprises a first linear portion and a second linear portion that is in fluid communication with, and that extends transversely to, the first linear portion. By being in fluid communication, fluid lubricant that is in the first linear portion of the lubrication groove can easily flow to the second linear portion without having to traverse the bearing surface. Segmented configurations include those that are cruciate, i.e., those in which a second linear portion intersects the first linear portion; those that are T-shaped; and those that merely define angles between two straight portions of the groove. In various embodiments, a cruciate lubrication groove may comprise a plurality of portions that are in fluid communication with, and that extend transversely to, a first linear portion. A segmented lubrication groove allows lubricant to be delivered directly to the mating surfaces of the bearing members over a much greater surface area while the bearing is in use, relative to a conventional, simply linear lubrication groove.

Figure 12:
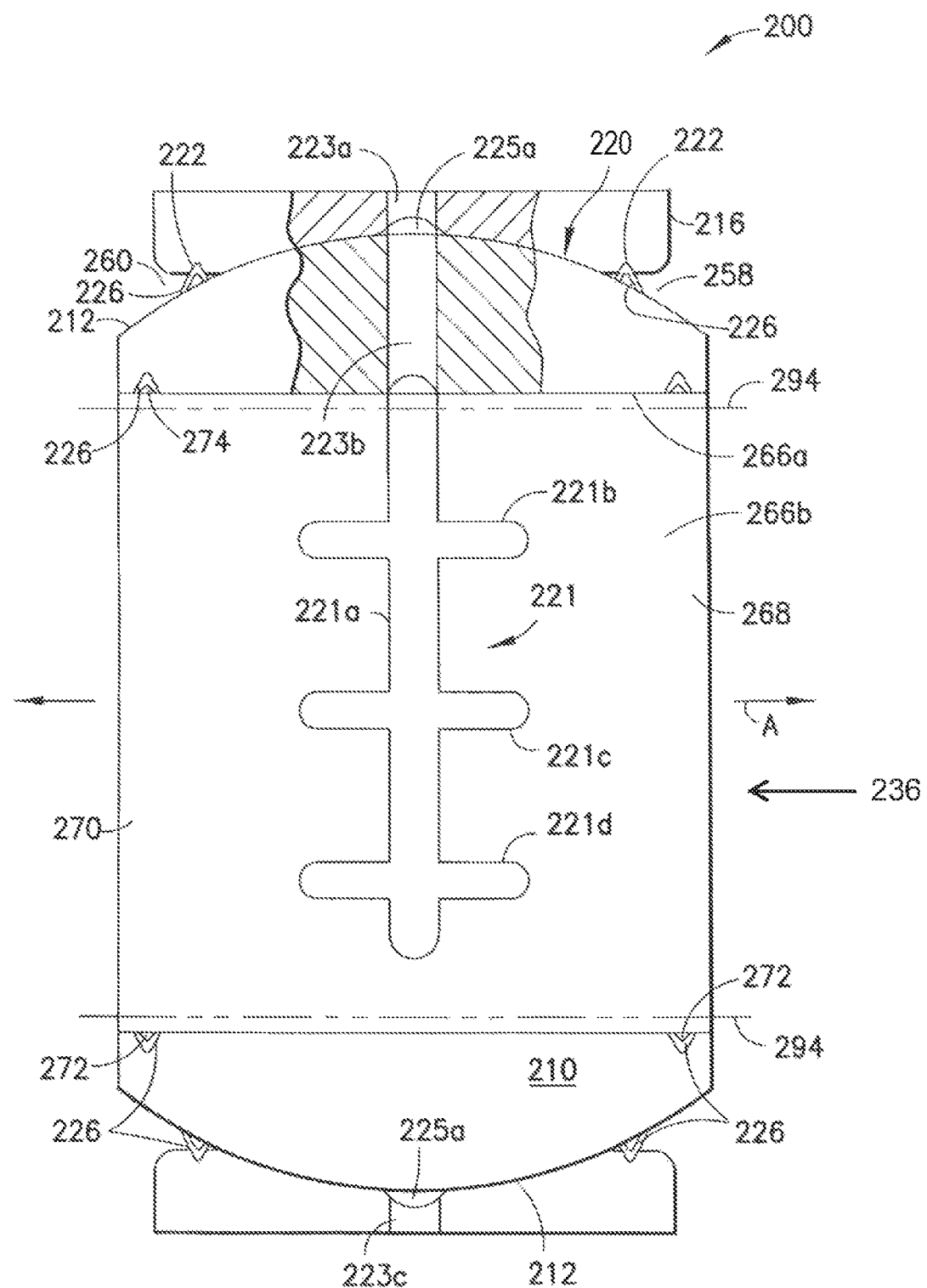
FIG. 12 is a schematic partial cross-sectional view of a one embodiment of a spherical plain bearing.
Figure 14A:
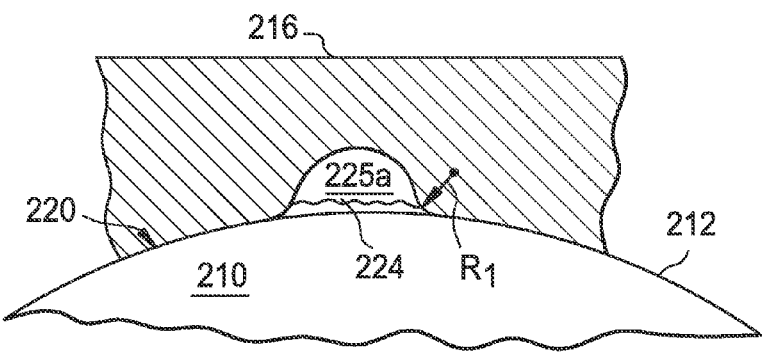
FIG. 14A is a schematic cross-sectional view part of a spherical plain bearing member having a lubrication groove with a contoured side in a convex spherical surface of the outer ring.

The bearing 200 shown in FIG. 12 is a spherical plain bearing comprising a first bearing member provided by an inner ring 210 and a second bearing member provided by an outer ring 216. The outer ring 216 has an annular configuration with a central axis A and a spherical concave bearing surface 220 that faces the central axis and is open at axial ends 258, 260. The spherical concave surface 220 has a lubrication groove 225a formed therein as shown in FIG. 14A. The inner ring 210 is disposed within the outer ring 216, and the inner ring has an annular configuration and has a spherical convex bearing surface 212 that engages the spherical concave bearing surface 220. There are lubrication supply apertures 223a, 223c in the outer ring 216 for providing lubricant to the load zone at the interface of the bearing surface 220 and the bearing surface 212. The lubrication supply apertures communicate with the lubrication grooves in the bearing surfaces described below. As shown in the embodiment illustrated in FIG. 14B, the spherical convex bearing surface 212 has a lubrication groove 225b formed therein. The lubrication grooves 225a and 225b are referred to herein collective as the lubrication groove 230 and described in detail herein.

The inner ring 210 has an interior mounting surface 266a that defines a passage 266b (FIG. 12) extending therethrough and a central axis therein. The passage 266b defines a first inner ring opening 268 at one end thereof and a second inner ring opening 270 at the opposite end thereof.

The interior mounting surface 266a of the inner ring 210 has a segmented lubrication groove 221 (seen in FIG. 12) formed therein that is open to the passage 266b. The lubrication groove 221 comprises a generally linear first portion 221a and a generally linear second portion 221b that is in fluid communication with, and disposed in transverse relation to, the first portion 221a. In particular, the second portion 221b intersects first portion 221a. In addition, the lubrication groove 221 comprises optional third and forth portions 221c and 221d, both of which communicate with, and are disposed in transverse relation to, the first portion 221a. It should be noted that this generally linear lubrication groove is just one embodiment of the grooves that could be used on the interior mounting surface. The grooves can have any characteristic such as curved or spiral, a common characteristic being that the interior surface lubrication grooves intersect with the lubricant apertures, 223a and 223b, in the inner ring.

The lubrication groove 221 communicates with the lubricant apertures 223a and 223b in the rings 216 and 210, respectively, through which lubricant may be provided. The lubrication groove 221 serves as a reservoir for a lubricant 224 thus provided to lubricate interior mounting surface 266a and a mounted member in inner ring 210 to reduce wear, enhance rotational characteristics and decrease rotational friction of the mounted member in the bearing.

Figure 13:
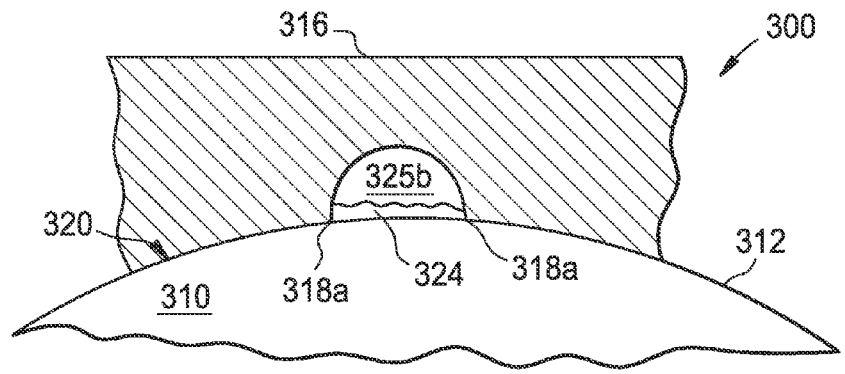
FIG. 13 is a schematic cross-sectional view part of a spherical plain bearing member having a lubrication groove with sharp edges.

As shown in FIG. 13, a bearing 300 has a prior art lubrication groove 325b that has a conventional configuration, i.e., it is substantially linear and comprises sharp edges 318a at the bearing surface. The lubrication groove serves as a reservoir for lubricant 334 that is drawn into the interface of the surfaces 312 and 320 as the bearing functions. However, sharp edges tend to wipe lubricant from the surface 312 as the inner ring 310 moves relative to the outer ring 316, thus inhibiting lubricant 324 from lubricating the bearing.

Figure 14B:
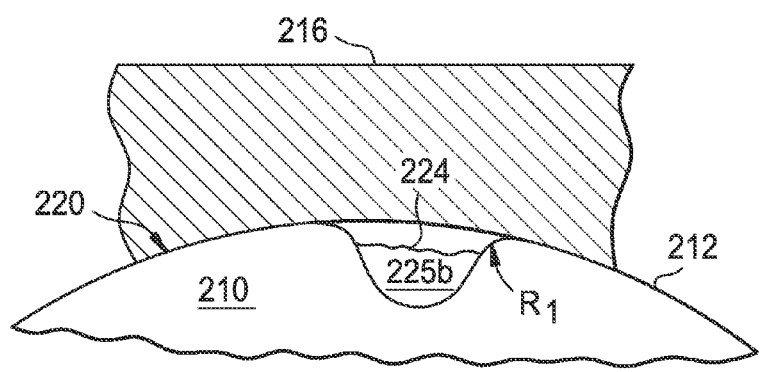
FIG. 14B is a schematic cross-sectional view part of a spherical plain bearing member having a lubrication groove with a contoured side in a concave spherical surface of the inner ring.

In contrast, the bearing 200 has a lubrication groove 225a formed in the outer ring 216 that has contoured sides, as seen in FIG. 14A; or a lubrication groove 225b formed in the inner ring 210 that has contoured sides, as seen in FIG. 14B. For example, the side may have a rounded cross-sectional profile having an effective radius $R_1$ to provide a generally smooth transition between the surface of the lubrication groove 225a and the bearing surface 220, or the surface of the lubrication groove 225b and the bearing surface 212. As a result, the groove 225a, 225b does not have sharp-edged sides that exhibit the wiping tendency of prior art lubrication grooves, and less of the lubricant 224 is wiped off of the surface 212 than would be if the sides defined sharp edges. Accordingly, more lubricant 224 remains between the surfaces 212 and 220 during use of the bearing, thus extending the bearing life. A lubrication groove can be provided with a contoured side in various ways. For example, the bearing can be made with a sharp edge as is known in the art, and the sharp edge can be machined down to the desired profile by means of applying a vibratory finish. Alternatively, the contoured side may be achieved by means of a tool cut.

Figure 15:
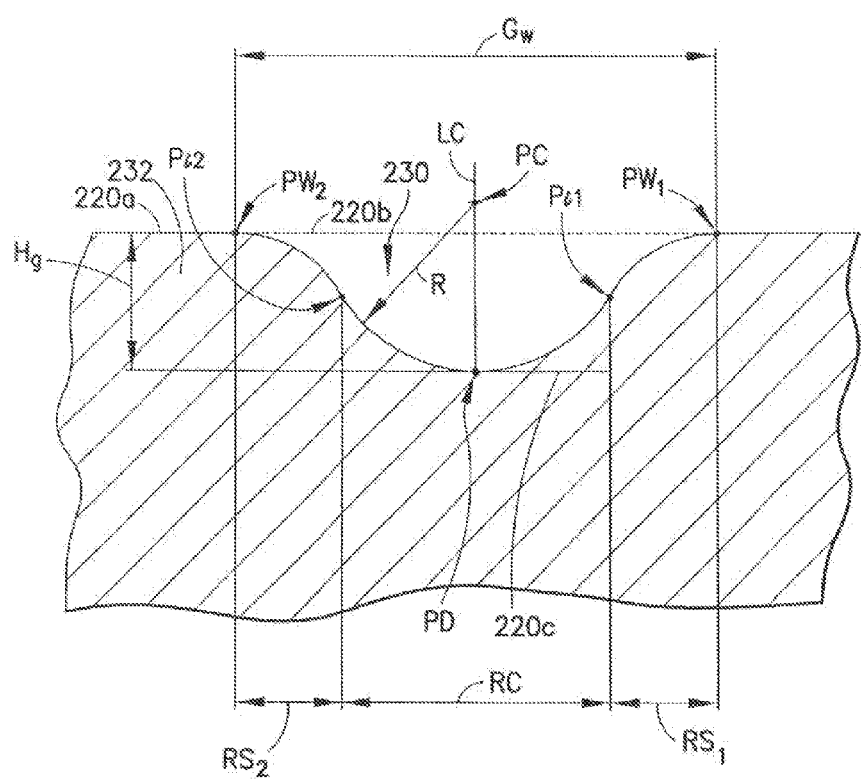
FIG. 15 is a schematic cross-sectional view of part of a spherical plain bearing having a contoured lubrication groove.
Figure 16:
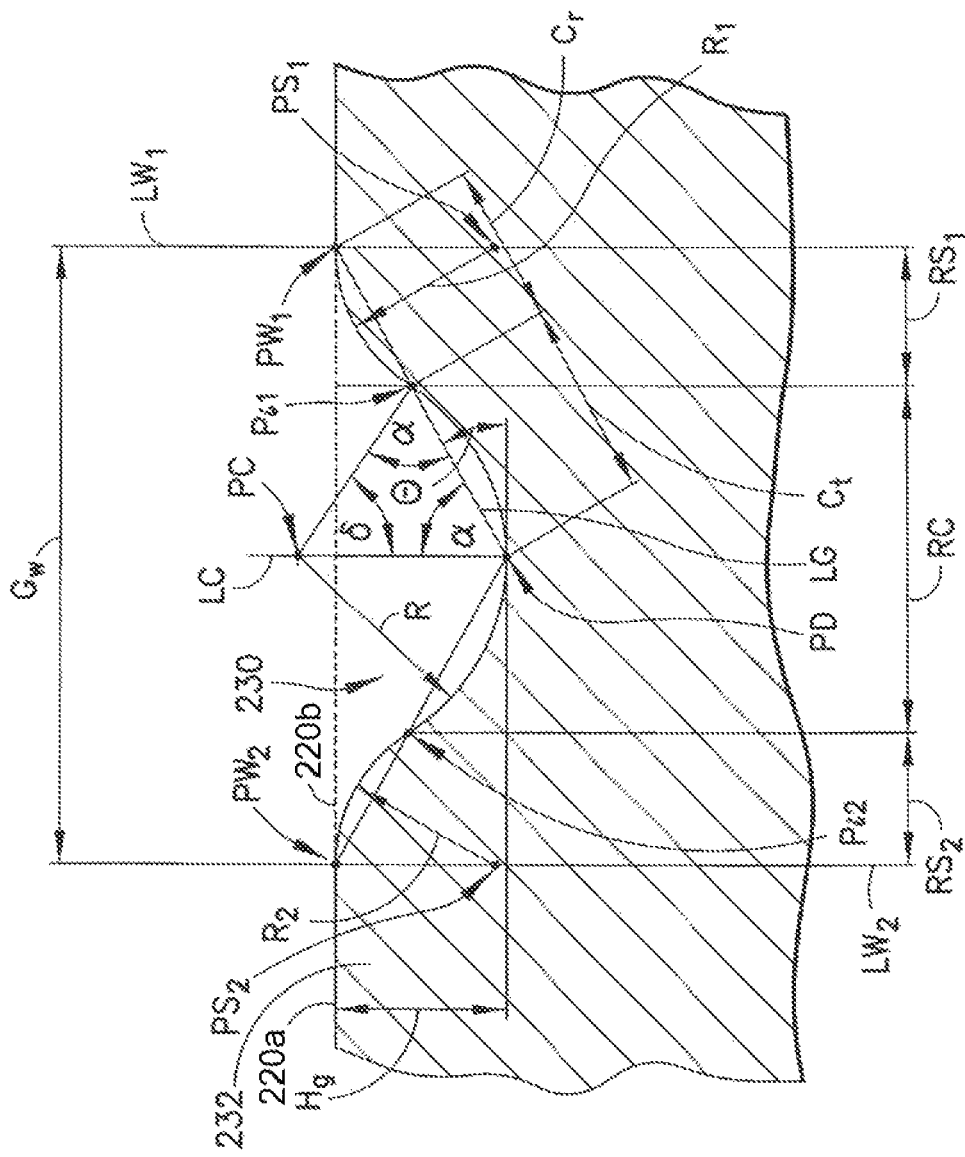
FIG. 16 is a schematic cross-sectional view of part of a spherical plain bearing having a contoured lubrication groove.

Details of a specific embodiment of the lubrication groove with contoured sides as described herein are disclosed in relation to the groove 230 shown in FIGS. 15 and 16. For ease of illustration, the bearing surface 220a is show as a flat surface on the ring member 232, but it will be understood that the groove 230 will be formed in a spherical surface, and that description of the features of the groove 230 provided herein will pertain nonetheless to an acceptable approximation. While the bearing surface 220a and the projection of that surface, 220b, across the lubrication groove is shown for simplicity as being linear, the surface 220a and the projection thereof 220b are either concave bearing surfaces (on the outer ring 216) or convex bearing surfaces (on the inner ring 210). Because the concave and convex radii of the lubrication groove are small relative to the radius of the concave or convex bearing surfaces, for the purposes of calculations the bearing surfaces can be treated as planar.

The groove 230 has a nominal finish depth Hg from the adjacent bearing surface 220a to the deepest point PD in the groove 230 measured on a perpendicular from the adjacent bearing surface 220a. The groove 230 also has an overall width $G_w$, which extends from side point $PW_1$ on the bearing surface to side point $PW_2$, at which points the surface of the groove 230 is machined to tangentially depart towards point PD from the plane or spherical surface 220b of the bearing surface.

The groove 230 has two contoured side regions $RS_1$, $RS_2$ and a central region RC. The central region RC is concave and conforms substantially to a circular arc defined by a central circular radius R. Radius R originates from a point PC that is on a line LC, line LC being perpendicular to the plane of the bearing surface and passing through point PD. In one embodiment, the point PC is offset from the bearing surface 220a so that R is greater than Hg. However, the present invention is not limited in this regard as it is also contemplated that in other embodiments R is less than or equal to Hg. The surface of the groove in region RC coincides with a circular sector bounded by points $Pi_1$ and $Pi_2$.

The sides of the groove 230, which are in side regions $RS_1$ and $RS_2$, are machined to be convex and to conform to substantially circular arcs defined by "blend radii" $R_1$ and $R_2$ (FIG. 16), respectively. The blend radii $R_1$, $R_2$ originate from points $PS_1$ and $PS_2$ that are on lines $LW_1$ and $LW_2$, lines $LW_1$ and $LW_2$ being perpendicular to the bearing surface at side points $PW_1$ and $PW_2$. The blend radii $R_1$, $R_2$ are smaller in magnitude than $H_g$. The arcs of side regions $RS_1$ and $RS_2$ are bounded by points $Pi_1$ and $PW_1$ and points $Pi_2$ and $PW_2$, respectively, and merge substantially tangentially with the bearing surface 220a at points $PW_1$ and $PW_2$. The sides of the groove 230 merge substantially tangentially with the concave groove surface of region RC at transition points $Pi_1$ and $Pi_2$, where the groove surface changes between being concave and convex.

A line LG drawn from the point PD to a point $PW_1$ passes through the transition point $Pi_1$ and defines angle α relative to Line LC and an angle θ (=90°−α) relative to a plane 220c parallel to the plane 220b of the bearing surface. The line LG has a first chord Ct that extends between PD and the $Pi_1$ and a second chord Cr that extends from $Pi_1$ to the nearest side point $Pi_1$. Preferably, the blend radii $R_1$ and $R_2$ should be at least equal to, or greater than, the chord Cr. The end points of chord Ct define an angle δ having an apex at PC.

In one embodiment, the blend radii $R_1$ and $R_2$ are substantially equal to the radius of curvature R. For example, in one illustrative embodiment the central circular radius R is equal to about 0.06 inch (1.52 mm) and radii $R_1$ and $R_2$ are each equal to about 0.04 inch (1.02 mm). In addition, the groove 230 has a width $G_W$ of about 0.175 inch (4.45 mm) and a groove depth Hg of 0.05 inch (1.27 mm). In one embodiment, radii of curvature $R_1$ and $R_2$ are greater than or equal to 0.7 times the central radius R. For example, when the central circular radius R is 0.06 inches (1.52 mm), radii $R_1$ and $R_2$ are about 0.042 inches (1.07 mm) or greater; and when the central circular radius R is 0.09 inches (2.29 mm), radii $R_1$ and $R_2$ are about 0.063 inches 1.60 mm) or greater. Since the groove 230 has radii $R_1$ and $R_2$ which are greater than or equal to 0.7 times the central radius R there is a greater reservoir for storage of lubricant, such as grease, located at a top portion of the groove that is available for lubrication of the convex surface 18 of the outer ring 16 and/or the concave surface 20 of the inner ring 12, compared to prior art grooves. In contrast, prior art grooves typically have convex portions having radii of curvature $R_1$ and $R_2$ that are much less than the radius of curvature R of the concave central region of the groove. For example, prior art grooves have radii $R_1$ and $R_2$ that are less than 0.1 times R or less than 0.01 times R. Such prior art grooves have less reservoir capacity at the top portion of the groove than the groove 230 described herein, and are typically used in oil lubricated bearings that require an external source of pressurized oil to meet lubrication demands.

In another illustrative embodiment R is equal to about 0.05 inch (1.27 mm) and radii $R_1$ and $R_2$ are each equal to about 0.035 inch (0.89 mm). In addition, the groove 230 has a width $G_w$ of about 0.11 inch (2.79 mm) and a groove depth $H_g$ of 0.04 inch (1.02 mm).

In various embodiments, the bearing surfaces of a spherical plain bearing may have one or more lubrication grooves that have sharp edges or contoured sides, or both.

Referring to FIGS. 12, 15, 16 and 19 the spherical plain bearing 200 includes, an outer ring 216 having a first peripheral edge, an opposing second peripheral edge, and a spherical concave bearing surface 220 extending between the first peripheral edge and the second peripheral edge. The spherical plain bearing 200 includes an inner ring 210 having a bore 236 located therein and a spherical convex bearing surface 212. The spherical convex bearing surface 212 is located in interfacial sliding engagement with the spherical concave bearing surface 220. A lubrication groove 225a is formed in the spherical concave bearing surface 220. In one embodiment, a lubrication groove 225b is formed in the spherical convex bearing surface 212. The lubrication grooves 225a and 225b (230 collectively) and have a contoured shape defined by a concave central portion RC conforming substantially to a circular arc defined by a central circular radius R a first center point PC of which is on a line LC that is perpendicular to the spherical convex bearing surface 220 or the spherical concave bearing surface 212. The center point PC is offset from the spherical convex bearing surface 220 or the spherical concave bearing surface 212. The lubrication groove 225a and 225b (230 collectively) is further defined by convex side portions $RS_1$ and $RS_2$ which conform substantially to circular arcs defined by blend radii $R_1$ and $R_2$ with second center points $PS_1$ and $PS_2$, respectively, on lines that extend perpendicular to the spherical convex bearing surface 220 or the spherical concave bearing surface 212. The concave central portion RC has a first radius of curvature R and the convex side portions $RS_1$ and $RS_2$ have a second radius of curvature R1 and R2, wherein the second radius of curvature is at least 0.7 times the first radius of curvature. The lubrication groove 230 allows for periodic flushing of the lubricant 224 when additional lubricant is introduced into the lubrication groove under pressure.

As seen in FIG. 12, the bearing 200 comprises seals 226 in seal mounting grooves 222 at each end 258, 260 of the bearing cavity in the outer ring 216 to help retain lubricant in the and inhibit the entry of contaminants into the bearing load zone. There are also seals 226 in mounting grooves 272 formed in the convex surface of the inner ring 210 adjacent the first and second inner ring openings 268, 270, to provide a seal between the inner ring 210 and a member (such as a shaft) 294 on which the inner ring is mounted. The seals 226 and the grooves 222, 272 in which the seals are seated may be configured as described hereinabove.

Figure 17:
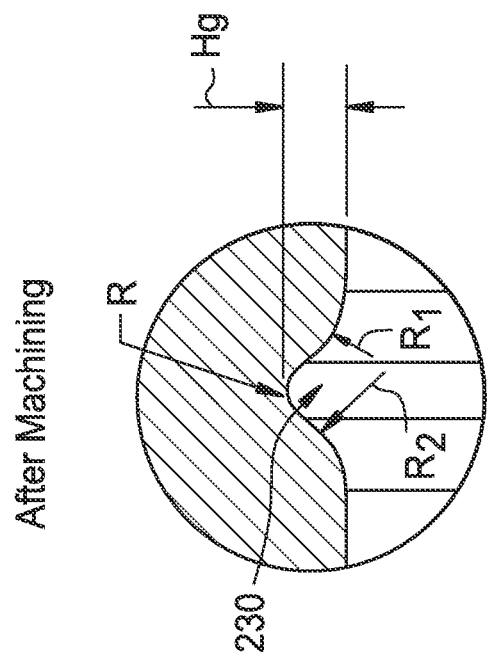
FIG. 17 is a schematic cross-sectional view of a portion of the groove of FIGS. 15 and 16 after machining

Referring to FIG. 17 the lubrication groove 230 is shown in an initial state after forming the groove, for example by machining. The lubrication groove 230 is shown having a depth Hg of about 0.070 inches (1.78 mm), after the initial forming of the groove and before finish grinding. In one embodiment, the depth Hg of the lubrication groove after the initial forming of the groove and before finish grinding is between about 0.068 and 0.072 inches (1.73 and 1.83 mm).

Figure 18:
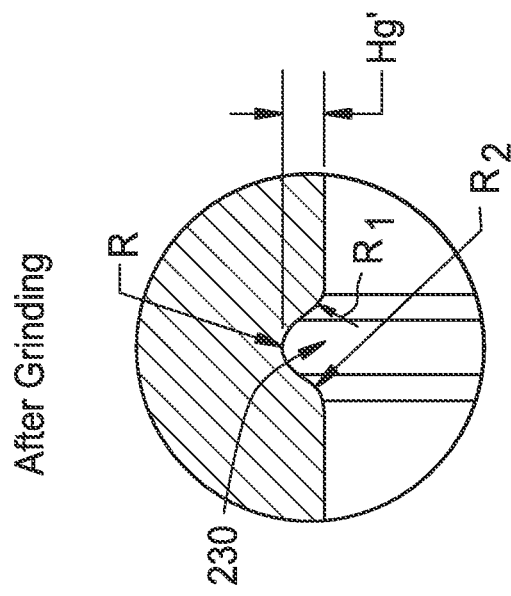
FIG. 18 is a cross-sectional view of a portion of the groove of FIGS. 15 and 16 after grinding.

Referring to FIG. 18, the lubrication groove 230 is shown after finish grinding. The lubrication groove 230 is shown having a depth Hg' of about 0.055 inches (1.40 mm), after finish grinding. In one embodiment, the depth Hg' of the lubrication groove after the finish grinding is between about 0.053 and 0.057 inches (1.35 and 1.45 mm).

Figure 19:
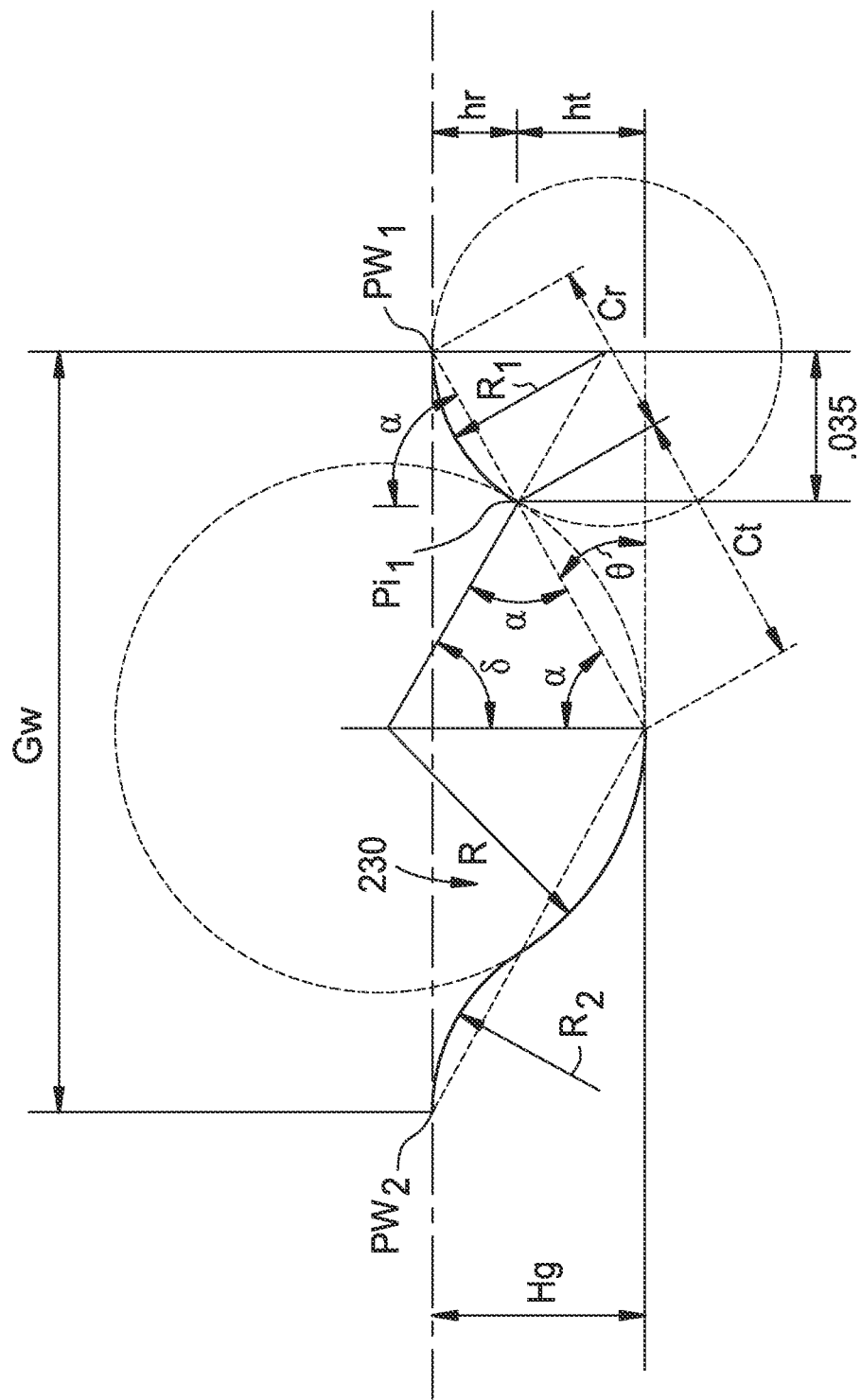
FIG. 19 is a cross-sectional view of a portion of the groove of FIGS. 15 and 16 showing annotation of groove attributes.

Referring to FIG. 19, the location of the transition point $Pi_1$ is defined by Equation 1 as follows:

$$Ct = \sqrt{2R^2 - (2R^2 * \cos\delta)} \quad \text{Eq. 1}$$

Wherein:

$$\delta = 180 - 2\alpha$$

$$\alpha = \tan^{-1}\left(\frac{\frac{1}{2} * Gvr}{Hg}\right)$$

$$ht = \sin\theta * Ct$$

$$\theta = 90 - \alpha$$

$$hr = Hg - ht$$

$$Cr = \frac{hr}{\cos\alpha}$$

$$R1\min = Cr$$

$$Hg < R$$

In one embodiment, the transition point $Pi_1$ is located a lateral distance of about 0.035 inches (0.89 mm) from side point $PW_1$ of the groove 230. In one embodiment, wherein $R_1$ is at a minimum value, $R_1$min is equal to Cr.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A spherical plain bearing, said bearing comprising:
an outer ring having a first peripheral edge, an opposing second peripheral edge, and a spherical concave bearing surface extending between said first peripheral edge and said second peripheral edge;
an inner ring having a bore located therein and a spherical convex bearing surface, said spherical convex bearing surface being located in interfacial sliding engagement with said spherical concave bearing surface;
a lubrication groove in at least one of the spherical convex bearing surface and the spherical concave bearing surface, the lubrication groove having a width and a depth, the lubrication groove comprising a contoured shape defined by a concave central portion conforming substantially to a circular arc defined by a continuous first radius of curvature with a first center point on a line that is perpendicular to at least one of the spherical convex bearing surface and the spherical concave bearing surface, the first center point being offset from at least one of the spherical convex bearing surface and the spherical concave bearing surface, the lubrication groove being further defined by convex side portions conforming substantially to circular arcs defined by blend radii having a continuous second radius of curvature with second center points on lines that extend perpendicular to at least one of the spherical convex bearing surface and the spherical concave bearing surface, wherein the second radius of curvature is at least 0.7 times the first radius of curvature and is smaller in magnitude than the lubrication groove depth, and wherein the first radius of curvature transitions into each of the second radius of curvature of the blended radii at a single transition point; and
wherein the lubrication groove allows for periodic flushing of the lubricant when additional lubricant is introduced into the lubrication groove under pressure.

2. The spherical plain bearing of claim 1, further comprising a lubricant disposed at the location of interfacial sliding engagement of said spherical convex bearing surface and said spherical concave bearing surface.

3. The spherical plain bearing of claim 1, wherein at least one of said inner ring and said outer ring is case hardened using a process selected from the group consisting of carburizing, nitriding, carbonitriding, and nitrocarburizing.

4. The spherical plain bearing of claim 1, further comprising a first inner ring seal located in a surface of said bore and proximate one end of said inner ring.

5. The spherical plain bearing of claim 4, wherein said first inner ring seal has a first lip and a second lip connected together to form a substantially v-shaped cross-sectional geometry and located in said surface of said bore such that said first lip and said second lip can be maintained in dual sealing engagement with a member extending into said bore.

6. The spherical plain bearing of claim 4, further comprising a second inner ring seal located in said surface of said bore and proximate another end of said inner ring.

7. The spherical bearing of claim 6, further comprising:
a first outer ring seal located in a first seal groove defined by said outer ring; and
a second outer ring seal located in a second seal groove defined by said outer ring, said first outer ring seal and said second outer ring seal each having a first lip and a second lip connected together to form a substantially v-shaped cross-sectional geometry, said first seal groove and said second seal groove each being located inboard of an end face defined by said outer ring, said first lip and said second lip being in sealing engagement with said spherical convex bearing surface, and said spherical convex bearing surface and said spherical concave bearing surface being case hardened.

8. The spherical bearing of claim 1 comprising:
a first outer ring seal located in a first seal groove defined by said outer ring; and
a second outer ring seal located in a second seal groove defined by said outer ring, said first outer ring seal and said second outer ring seal each having a first lip and a second lip connected together to form a substantially v-shaped cross-sectional geometry, said first seal groove and said second seal groove each being located inboard of an end face defined by said outer ring, said first lip and said second lip being in sealing engagement with said spherical convex bearing surface, and said spherical convex bearing surface and said spherical concave bearing surface being case hardened.

9. The spherical plain bearing of claim 1, wherein the convex side portions blend into at least one of the spherical convex bearing surface and the spherical concave bearing surface.

10. The spherical plain bearing of claim 1, wherein the groove is bounded by side points, and wherein the concave central portion transitions into each of the convex side portions at the respective transition point, and wherein the second radius of curvature of each convex side portion is about equal to a distance from the respective transition point to the respective side point at which the convex side portion blends into the bearing surface, and wherein the second radius of curvature emanates from a point on a line that is perpendicular to the bearing surface at the respective side point of the groove.

11. The spherical plain bearing of claim 1 wherein the lubrication groove is a segmented lubrication groove.

12. The spherical plain bearing of claim 11, wherein the segmented lubrication groove comprises a first generally linear portion and a second generally linear portion that intersects with the first generally linear portion.

13. The spherical plain bearing of claim 11, wherein the segmented lubrication groove comprises a contoured side.

14. The spherical plain bearing of claim 1, wherein the inner ring has an interior mounting surface for engaging a member on which the inner ring is mounted, and a segmented lubrication groove in the interior mounting surface.

15. The spherical bearing of claim 1, wherein said inner ring and said outer ring are case hardened.

16. The spherical bearing of claim 1, wherein said inner ring and said outer ring are through hardened.

17. The spherical bearing of claim 1, wherein:
the first radius of curvature is about 0.06 inch (1.52 mm); and
the second radius of curvature is about 0.042 inch (1.07 mm).

18. The spherical bearing of claim 17, wherein:
the lubrication groove width is about 0.175 inch (4.45 mm); and
the lubrication groove depth is about 0.05 inch (1.27 mm).

19. The spherical bearing of claim 1, wherein:
the first radius of curvature is about 0.09 inch (2.29 mm); and
the second radius of curvature is about 0.063 inch (1.60 mm).

20. The spherical bearing of claim 1, wherein:
the first radius of curvature is about 0.05 inch (1.27 mm); and
the second radius of curvature is about 0.035 inch (0.89 mm).

21. The spherical bearing of claim 20, wherein:
the lubrication groove width is about 0.11 inch (2.79 mm); and
the lubrication groove depth is about 0.04 inch (1.02 mm).

22. The spherical bearing of claim 1, further comprising:
a deepest point in the lubrication groove located along the first radius of curvature;
a chord defined between the deepest point in the lubrication groove and the transition point; and
a chord angle defined between the chord and the line extending along the first radius of curvature that is perpendicular to at least one of the spherical convex bearing surface and the spherical concave bearing surface;
wherein a length of the chord is defined by an equation as follows:

$$Ct = \sqrt{2R^2 - (2R^2 \cdot \cos\delta)}$$

wherein:
Ct=length of the chord;
R=first radius of curvature;
$\delta = 180 - 2\alpha$; and
$\alpha$=the chord angle.

23. The spherical bearing of claim 22, wherein the chord angle is defined by an equation as follows:

$$\alpha = \tan^{-1}\left(\frac{\frac{1}{a} * Gw}{Hg}\right)$$

wherein:
Gw=the width of the lubrication groove; and
Hg=the depth of the lubrication groove.

24. The spherical bearing of claim 22, further comprising:
a depth of the transition point defined by an equation as follows:

$$hr = Hg - ht$$

wherein:
$ht = \sin\theta \cdot Ct$
$\theta = 90 - \alpha$.

* * * * *